United States Patent [19]
Taomo et al.

[11] Patent Number: 6,039,037
[45] Date of Patent: Mar. 21, 2000

[54] POWER CUTTER AND CENTRIFUGAL CLUTCH FOR A POWER CUTTER

[75] Inventors: Toshio Taomo; Wang Yan Song, both of Tokyo, Japan

[73] Assignee: Kioritz Corporation, Tokyo, Japan

[21] Appl. No.: 09/023,800

[22] Filed: Feb. 13, 1998

[30] Foreign Application Priority Data

Feb. 14, 1997 [JP] Japan ...................................... 9-030786

[51] Int. Cl.$^7$ ...................................................... B28D 1/04
[52] U.S. Cl. ............................ 125/13.01; 30/124; 30/390
[58] Field of Search ................................ 83/100; 30/124, 30/389, 390, 391; 192/105 BA, 105 BB, 105 CD, 105 CE; 451/456, 358; 125/13.01

[56] References Cited

FOREIGN PATENT DOCUMENTS 714570  2/1995  Japan .

*Primary Examiner*—Rinaldi I. Rada
*Assistant Examiner*—Dominic Troiano
*Attorney, Agent, or Firm*—Baker Botts, L.L.P.

[57] ABSTRACT

A power cutter is disclosed whose dust suction-discharge fan is driven to rotate at a high speed to thereby attain sufficient dust suction-discharge performance, and which can be constructed relatively compactly in size as a whole at a reduced cost. The power cutter includes two rotating operative components (30, 50) driven by a prime mover (5) and a centrifugal clutch (10) operatively connected to the output shaft (7) of the prime mover (5) for rotationally driving the two rotating operative components (30, 50). The centrifugal clutch (10) includes a clutch drum (11) composed integrally of a small diameter pulley portion (21) and a large diameter pulley portion (22). Belt-type drive trains (15A, 16A and 17A, 18A) transmit the rotational drive force to the rotating operative components (30, 50), respectively.

2 Claims, 5 Drawing Sheets

POWER CUTTER AND CENTRIFUGAL CLUTCH FOR A POWER CUTTER

BACKGROUND OF THE INVENTION

1. Field of the Invention

The present invention relates to a portable power cutter having two rotating operative components rotationally driven by a prime mover such as a small air-cooled two-cycle gasoline engine or an electric motor. More particularly, the invention relates to a power transmission mechanism for a portable power cutter having, as the rotating operative components, an operative cutter (having cutting means such as a cutter blade) and a dust suction-discharge fan for discharging the dust resulting from the cutting operation.

2. The Prior Art

In prior art portable power cutters of this type, there has heretofore been proposed and used a body or frame carrying a prime mover, an operative cutter including cutting means, such as a cutter blade, a safety cover, etc., and a dust suction-discharge fan for discharging by sucking the dust resulting from use of the cutting means on concrete-formed material or the like.

In such conventional portable power cutters, the cutting means is driven by the prime mover to rotate, and the driving force of the prime mover is also used to rotationally drive the dust suction-discharge fan.

In the conventional power cutters, however, the cutting means is driven by the prime mover to rotate at a reduced speed and the dust suction-discharge fan is also driven by the prime mover at a reduced rotational speed or at the same speed. Accordingly, the dust suction-discharge fan is likely to be incapable of exhibiting sufficient dust suction-discharge performance.

SUMMARY OF THE INVENTION

The present invention has been made in view of the above-described problem. It is therefore an object of the present invention to provide a power cutter whose dust suction-discharge fan is driven to rotate at a high speed so as to attain sufficient dust suction-discharge performance, and which can be constructed relatively compactly in size as a whole at a reduced cost.

To achieve the above object, a power cutter according to the present invention basically comprises:

two rotating operative components driven by a prime mover, and a centrifugal clutch operatively connected to an output shaft of the prime mover for rotationally driving the two rotating operative components, the centrifugal clutch including a clutch drum composed integrally of a small diameter pulley portion and a large diameter pulley portion.

As a preferred embodiment of the invention, a portable power cutter comprises:

a body carrying a prime mover, an operative cutter having cutting means such as a cutter blade, and a dust suction-discharge fan for discharging by sucking dust resulting from cutting operations carried out by use of the cutting means;

the power cutter being provided with a centrifugal clutch operatively connected to an output shaft of the prime mover, the centrifugal clutch including a clutch drum composed integrally of a small diameter pulley portion and a large diameter pulley portion, the cutting means being driven by the prime mover via the small diameter pulley portion and a first belt to rotate at a reduced speed, the dust suction-discharge fan being driven by the prime mover via the large diameter pulley portion and a second belt to rotate at an increased speed.

In a further preferred embodiment, the rotational driving force of the prime mover is transmitted via the small diameter pulley portion and the first belt to a large diameter pulley rotatably fitted on a first relay shaft, and therefrom, is transmitted to the cutting means via a first relay pulley formed integrally with the large diameter pulley on the first relay shaft and a third belt.

In a still further preferred embodiment, the rotational driving force of the prime mover is transmitted via the large diameter pulley portion and the second belt to a small diameter pulley fixedly fitted on a second relay shaft, and therefrom, is transmitted to the dust suction-discharge fan via a second relay pulley fixedly fitted on the second relay shaft and a fourth belt.

In the power cutter of the present invention constructed as described above, the clutch drum of the centrifugal clutch operatively connected to the output shaft of the prime mover is composed integrally of the small diameter pulley portion and the large diameter pulley portion. The cutting means is driven by the prime mover via the small diameter pulley portion and the first belt to rotate at a reduced speed, and the dust suction-discharge fan is driven by the prime mover via the large diameter pulley portion and the second belt to rotate at an increased speed. Accordingly, the dust suction-discharge fan is driven to rotate at a high speed with ease as compared with conventional power cutters. This enables the dust suction-discharge fan to exhibit sufficient dust suction-discharge performance.

Further, the portable power cutting machine has such a structure that the expanded portion of the clutch drum of the centrifugal clutch is formed as the large diameter pulley portion, and the boss portion of the clutch drum is formed as the small diameter pulley portion. Accordingly, the machine can be constructed relatively compactly in size as a whole at a reduced cost considering the fact that it is provided with two rotating operative components, i.e., the operative cutter and the dust suction-discharge fan.

DESCRIPTION OF A PREFERRED EMBODIMENT

In the following, a preferred embodiment of the present invention is described with reference to the accompanying drawings.

Figure 1:
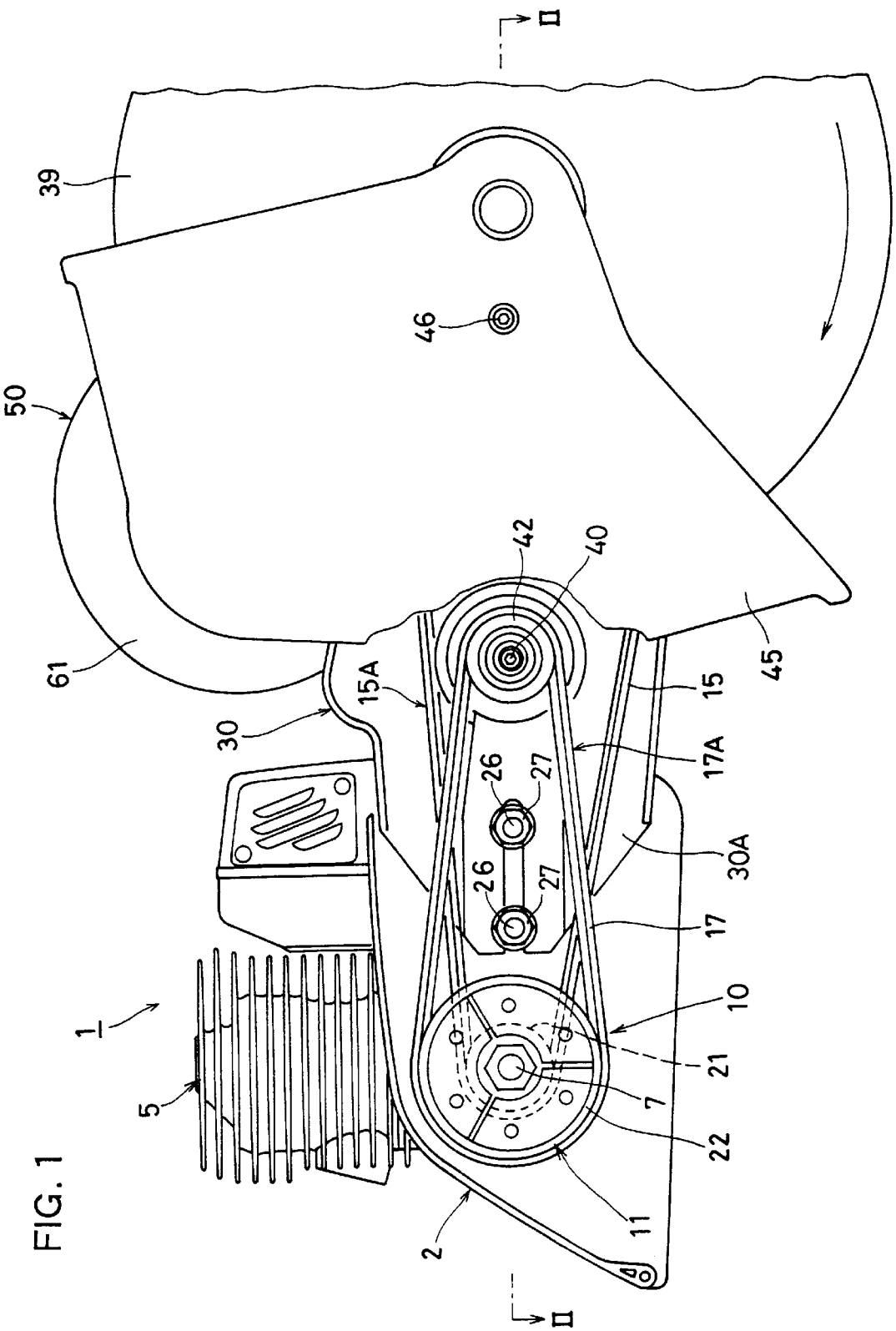
FIG. 1 is a side view showing a main portion of an embodiment of a power cutter according to the present invention.
Figure 2:
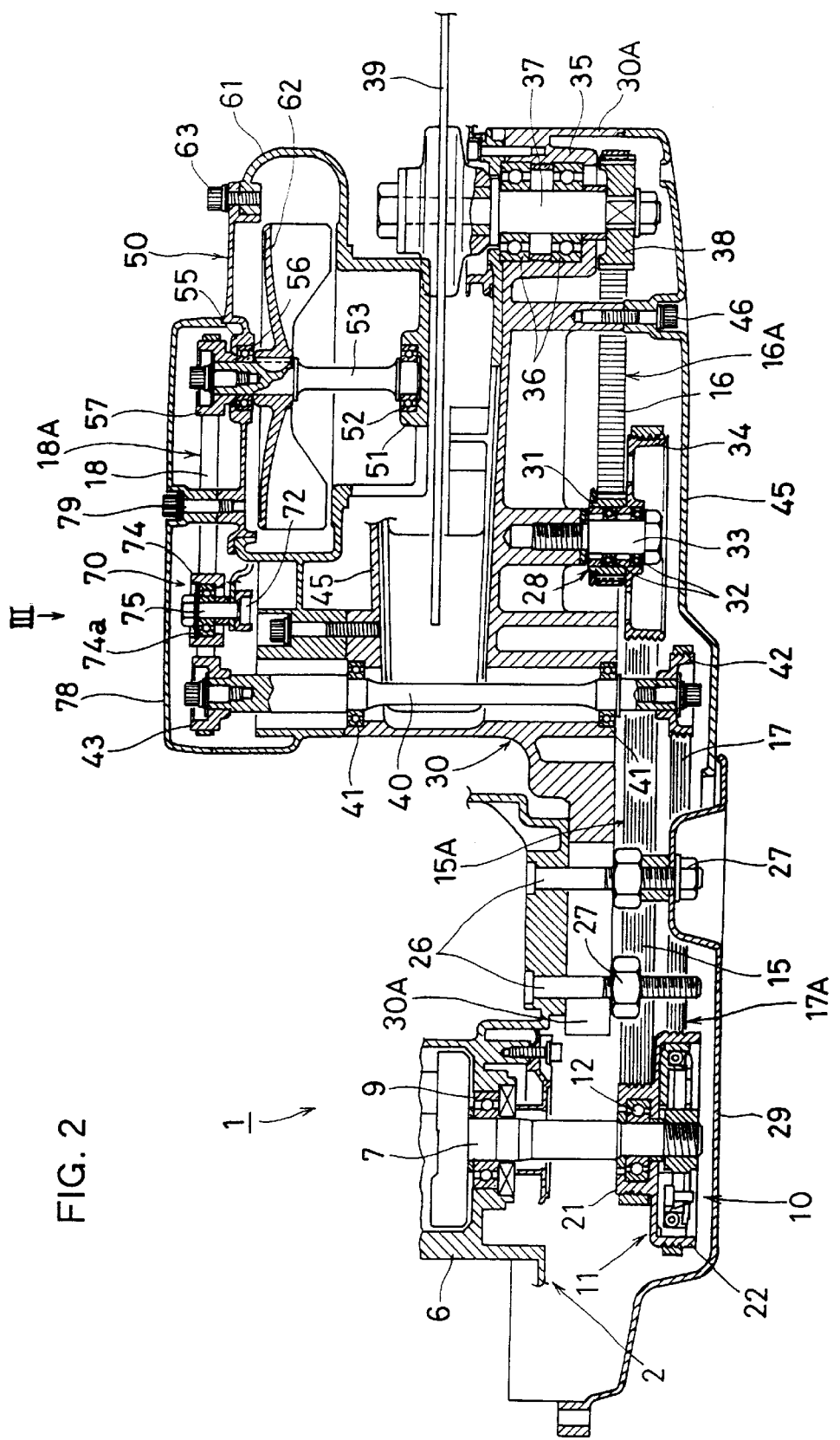
FIG. 2 is a sectional view taken along the line II—II and viewed in the direction of arrows in FIG. 1.

FIGS. 1 and 2 show a main part of an embodiment of a so-called engine-operated cutter as the portable power cutter according to the present invention, in which a handle frame, etc. are not shown.

The engine-operated cutter 1 as shown in FIGS. 1 and 2 includes a frame 2 and a small air-cooled two-cycle gasoline engine (hereinafter referred to simply as an engine) 5 as a prime mover approximately centrally disposed on the frame 2. Although not shown, a rear handle provided with a throttle trigger or the like is attached to the frame 2 at the back thereof and a front handle is so mounted on the frame 2 as to extend upward and forward from a lower center position thereof.

The engine 5 includes a crank case 6 and a crank shaft 7 journal-supported by the crank case 6 via ball bearings 9 (see FIG. 2). A centrifugal clutch 10, of conventional structure, is provided on the distal end of the crank shaft 7.

The centrifugal clutch 10 has a clutch drum 11 integrally composed of an expanded portion formed as a large diameter pulley portion 22 for a V ribbed belt 17 and a boss portion formed as a small diameter pulley portion 21 for another V ribbed belt 15. A ball bearing 12 is interposed between the clutch drum 11 formed into a two-step pulley and the crank shaft 7. When the centrifugal clutch 10 is actuated, rotational driving force from the crank shaft 7 is transmitted to the clutch drum 11.

An operative cutting component 30 having a disc-shaped cutter blade 39 as cutting means is mounted on the frame 2. A protective cover 29 is attached to the frame 2 so as to cover the clutch drum 11 in the form of the two-step pulley and vicinities thereof. As shown in FIGS. 1 and 2, rear portions of the operative cutting component 30 and the protective cover 29 are removably attached to the frame 2 by means of stud bolts 26, 26 and nuts 27, 27.

The operative cutting component 30 includes a supporting member 30A having a box-like structure, a substantially fan-shaped (sector-shaped) safety cover 45 attached to the supporting member 30A by a bolt 46, and a disc-shaped cutter blade 39 as cutting means substantially centrally disposed when viewed in plan. A dust suction-discharge fan 50 is disposed on the left side (upper side in FIG. 2) of the cutter blade 39 (see FIGS. 2 and 5).

Extending between the frame 2 and the supporting member 30A of the operative cutting component 30 are a first belt-type driving mechanism 15A and a second belt-type driving mechanism 16A for transmitting the rotational driving force of the engine 5 to the cutter blade 39, and a first belt-type driving mechanism 17A and a second belt-type driving mechanism 18A for transmitting the rotational driving force of the engine 5 to a vane wheel 62 of the dust suction-discharge fan 50.

The first belt-type driving mechanism 15A for the cutting means includes the small diameter pulley portion 21 formed on the clutch drum 11 and a large diameter pulley 34 for a V ribbed belt of a two-step relay pulley 28, which is integrally composed of the large diameter pulley 34 (having a diameter larger than that of the small diameter pulley portion 21) and a smaller diameter, toothed relay pulley 31. The two-step pulley 28 is rotatably mounted via ball bearings 32, 32 on a relay shaft 33 fixedly mounted on the supporting member 30A of the operative cutting component 30. The first belt-type driving mechanism 15A also includes the V ribbed belt 15, which has a relatively large width and is laid over the small diameter portion 21 and the large diameter pulley 34.

The second belt-type driving mechanism 16A for the cutting means includes the toothed relay pulley 31 of the two-step relay pulley 28, whose diameter is smaller than that of the large diameter pulley 34 and a toothed end pulley 38 having a diameter larger than that of the toothed relay pulley 31. The pulley 38 is fixed to one end of a rotatable shaft 37, to the other of which the cutter blade 39 is fixed. The rotatable shaft 37 is journal-supported via ball bearings 36, 36 within a shaft receiving section 35 formed in a front end portion of the supporting member 30A. The driving mechanism 16A also includes a toothed timing belt 16 laid over the relay pulley 31 and the end pulley 38.

Thus, the rotational driving force of the engine 5 is transmitted to the cutter blade 39 via the first belt-type driving mechanism 15A for the cutting means, which comprises the small diameter pulley 21, the V ribbed belt 15 and the large diameter pulley 34, and the second belt-type driving mechanism 16A for the cutting means, which comprises the relay pulley 31 integrated with the large diameter pulley 34, the timing belt 16 and the end pulley 38. Accordingly, the cutter blade 39 is driven by the engine 5 to rotate at a rotational speed double-reduced by the first and second belt-type driving mechanisms 15A, 16A; for example, at about 3,500 rpm.

The first belt-type driving mechanism 17A for the dust suction-discharge fan 50 includes the large diameter pulley portion 22 formed on the clutch drum 11, a small diameter pulley 42 for a V ribbed belt 17, which is fixed on one end of a relay shaft 40 that is journal-supported by the supporting member 30A via ball bearings 41. The diameter of the small diameter pulley 42 is smaller than that of the large diameter pulley portion 22. The driving mechanism 17A also includes the V ribbed belt 17 having a relatively small width and laid over the large pulley portion 22 and the small diameter pulley 42.

The second belt-type driving mechanism 18A for the dust suction-discharge fan 50 includes a relay pulley 43 fixed on the other end of the relay shaft 40, an end pulley 57 having a diameter substantially the same as or slightly smaller than that of the relay pulley 43 and fixed on a rotatable shaft 53 on which the vane wheel 62 is also fixed. The rotatable shaft 53 is journal-supported by shaft receiving portions 51, 55 formed in a fan casing 61 of the dust suction-discharge fan 50 via ball bearings 52, 56, respectively. The driving mechanism 18A also includes a flat belt 18 laid over the relay pulley 43 and the end pulley 57.

Thus, the rotational driving force of the engine 5 is transmitted to the vane wheel 62 via the first belt-type driving mechanism 17A, which comprises the large diameter pulley portion 22, the V ribbed belt 17 and the small diameter pulley 42, and the second belt-type driving mechanism 18A, which comprises the relay pulley 43, the flat belt 18 and the end pulley 57. Accordingly, the vane wheel 62 is driven by the engine 5 to rotate at an increased speed; to a level of, for example, about 20,000 rpm, by means of the first and second belt-type driving mechanisms 17A, 18A.

Figure 3:
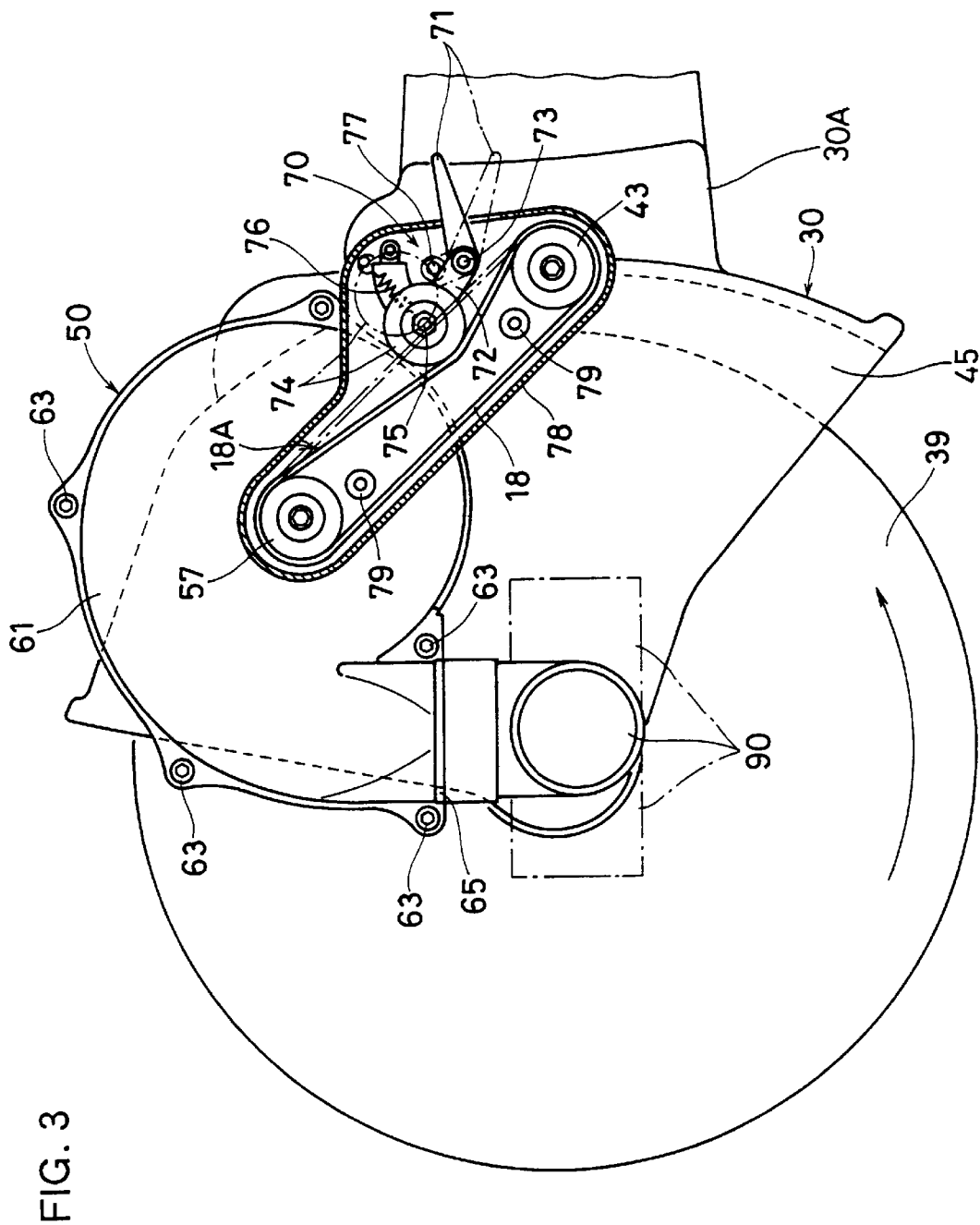
FIG. 3 is a partly sectional fragmentary side view viewed in the direction of arrow III in FIG. 2.
Figure 4:
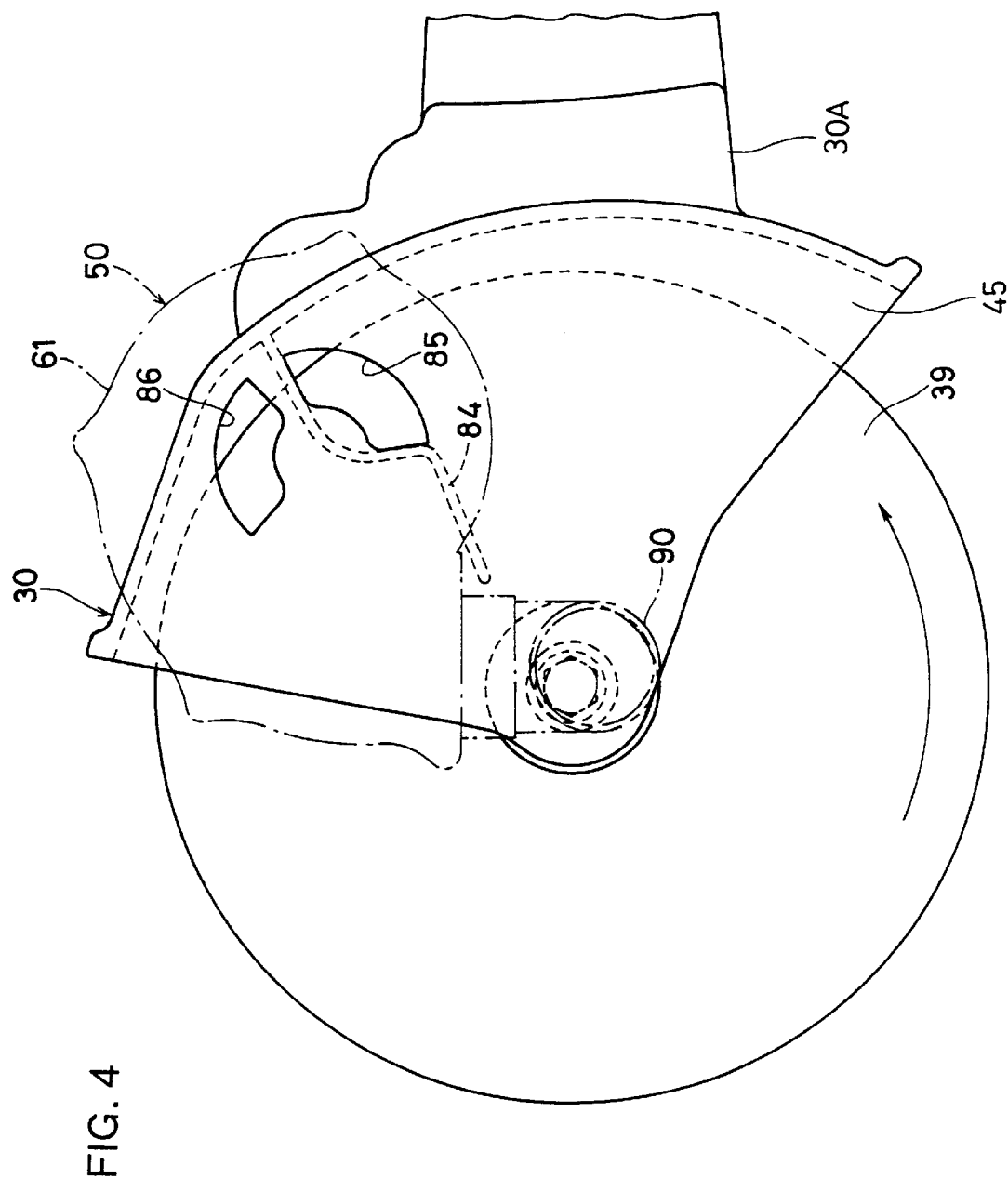
FIG. 4 is a view similar to FIG. 3 with the dust suction-discharge fan-related component removed therefrom.

As shown in FIG. 3, the dust suction-discharge fan 50, including the vane wheel 62, is provided with the fan casing 61 attached to the supporting member 30A. As is clearly shown in FIG. 4, a dust guide partition 84 is provided on the inner side of the safety cover 45. A main suction opening 85 and an auxiliary suction opening 86 for sucking dust resulting from cutting operations by means of the cutter blade 39 are provided in a portion of the safety cover 45 which substantially corresponds to the center portion of the fan casing 61, with the partition 84 interposed therebetween.

Further, to allow arbitrary connection and disconnection of the power transmission from the engine 5 to the vane wheel 62 of the dust suction-discharge fan 50, the second belt-type driving mechanism 18A therefor is additionally provided with a belt tension clutch 70 (see FIG. 3).

The belt tension clutch 70 includes a control lever 71 and a pivoted lever 72 which are pivotally mounted on a support pin 73 carried by the operative cutting component 30 in such a manner that they are fixed relative to each other in a dog-legged configuration. A tension roller 74 is rotatably supported by a pin 75 on the pivoted lever 72.

In the belt tension clutch 70, when the control lever 71 is turned counterclockwise in FIG. 3, the tension roller 74 is pressed against the flat belt 18 of the second belt-type driving mechanism 18A for the dust suction-discharge fan 50 to apply a predetermined tension to the flat belt 18, thereby putting the second belt-type driving mechanism 18A in condition to perform power transmission.

To maintain the power transmissive condition, i.e., to prevent the tension roller 74 from being pushed back by the flat belt 18, a lock pin 77 is provided as lock means in such a manner that it is retractable into the operative cutting component 30. When the pivoted lever 72 is turned counterclockwise in FIG. 3 to the illustrated position (tension applying position), the lock pin 77 protrudes by spring action towards this side of FIG. 3 to block the pivoted lever 72 by the upper surface. If the lock pin 77 is pushed from this blocking condition into the operative cutting component 30, the blocking condition is removed. When the lock pin 77 is retracted from the blocking condition, the pivoted lever 72 is pivotally moved clockwise by a tension spring 76. The tension roller 74 is thereby withdrawn from contact with the flat belt 18, rendering the flat belt 18 slack. In consequence, the second belt-type driving mechanism 18A for the dust suction-discharge fan 50 is decoupled from power transmission connection to the engine 5.

Figure 5:
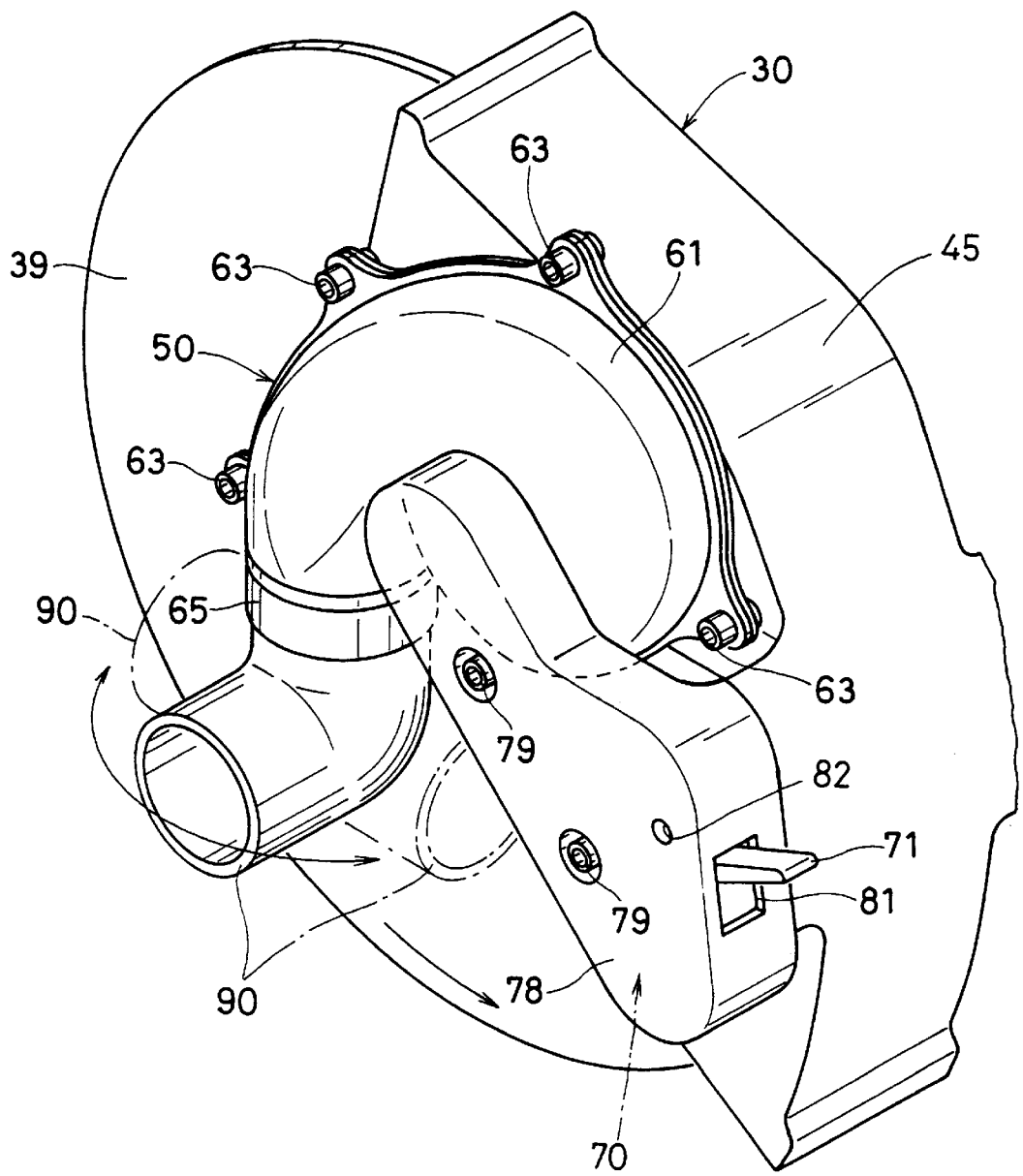
FIG. 5 is a perspective view showing an operative cutting component of the portable power cutting machine shown in FIG. 1.

As shown in FIG. 5, a protective cover 78 is attached by bolts 79 or the like to the component 30 so as to cover the second belt-type driving mechanism 18A for the dust suction-discharge fan 50 and the belt tension clutch 70. The protective cover 78 is provided with an opening 81 to allow the control lever 71 to be pivotally moved and with a tool-inserting hole 82 for convenience of push-in operation of the lock pin 77.

As further shown in FIG. 5, an elbow-shaped auxiliary dust discharge pipe 90 is attached to a dust discharge port 65 of the dust suction-discharge fan 50 in such a manner that it can be turned and kept at any turned position so as to allow the dust discharge direction to be changed according to the operational situation and the operational position of the machine. The elbow-shaped auxiliary discharge pipe 90 is turnable within an angular range of about 180 degrees between a forward-directed position and a backward-directed position (shown in FIG. 5 in phantom). It is kept at a turned position by means, for example, of a friction fit between it and the dust discharge port 65.

Also illustrated in FIG. 5, the fan housing 61 can be a two-piece clam shell like structure with the two pieces affixed to each other by bolts 63, or the like.

In the portable power cutting machine 1 according to the embodiment as described above, the small diameter pulley portion 21 and the large diameter pulley portion 22 are integrally formed as the clutch drum 11 of the centrifugal clutch 10 fitted on the crank shaft 7 of the engine 5. The cutter blade 39 is driven to rotate at a reduced speed via the first belt-type diving mechanism 15A for the cutting means (which includes the small diameter pulley portion 21) and the second belt-type driving mechanism 16A for the cutting means. The dust suction-discharge fan 50 is driven to rotate at an increased speed via the first belt-type driving mechanism 17A for the dust suction-discharge fan 50 (which includes the large diameter pulley portion 22) and the second belt-type driving mechanism 18A for the dust suction-discharge fan 50. Accordingly, the dust suction-discharge fan 50 is driven to rotate at a high speed with ease as compared with conventional power cutter fans. This enables the dust suction-discharge fan 50 to exhibit sufficient dust suction-discharge performance.

Further, the portable power cutting machine 1 has such a structure that the expanded portion of the clutch drum 11 of the centrifugal clutch 10 is formed as the large diameter pulley portion 22, and the boss portion of the clutch drum 11 is formed as the small diameter pulley portion 21. Accordingly, the machine can be constructed relatively compactly in size as a whole at a reduced cost considering the fact that it is provided with the two rotating operative components, i.e., the operative cutting component 30 and the dust suction-discharge fan 50.

In the above, a preferred embodiment of the present invention has been described in detail. It will be understood, however, that the present invention is not restricted to the above-described embodiment, and that various modifications may be made within the spirit and scope of the invention as defined in the claims.

As understood from the above description, the power cutting machine of the present invention has excellent effects in that it is capable of exhibiting sufficient dust suction-discharge performance because the dust suction-discharge fan can easily be driven to rotate at a high speed, and that it can be constructed relatively compactly in size as a whole at a reduced cost.

What is claimed is:

1. A portable power cutter, comprising:
   a frame carrying a prime mover having an output shaft;
   an operative cutting component having cutting means;
   a dust suction-discharge fan for discharging by sucking dust resulting from cutting operations carried out by said cutting means;
   a centrifugal clutch operatively connected to the output shaft of said prime mover, said centrifugal clutch including a clutch drum composed integrally of a small diameter pulley portion and a large diameter pulley portion;
   said cutting means being driven by said prime mover via said small diameter pulley portion and a first belt to rotate at a reduced speed, relative to the speed of the output shaft; and
   said dust suction-discharge fan being driven by said prime mover via said large diameter pulley portion and a second belt to rotate at an increased speed relative to the speed of said output shaft, wherein the rotational driving force of said prime mover is transmitted via said small diameter pulley portion and said first belt to a large diameter pulley rotatably mounted on a first relay shaft and, therefrom, via a first relay pulley formed integrally with said large diameter pulley and a third belt to said cutting means.

2. The portable power cutting machine according to claim 1, wherein the rotational driving force of said prime mover is transmitted via said large diameter pulley portion and said second belt, to a small diameter pulley fixedly fitted on a second relay shaft and, therefrom, via a second relay pulley fixedly fitted on said second relay shaft and a fourth belt.

* * * * *